United States Patent
Yasuda

(10) Patent No.: US 9,194,430 B2
(45) Date of Patent: Nov. 24, 2015

(54) SPLIT CAGE AND ROLLER BEARING

(71) Applicant: JTEKT CORPORATION, Osaka-shi, Osaka (JP)

(72) Inventor: Hirotaka Yasuda, Kashihara (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 14/542,925

(22) Filed: Nov. 17, 2014

(65) Prior Publication Data

US 2015/0147015 A1 May 28, 2015

(30) Foreign Application Priority Data

Nov. 25, 2013 (JP) ................. 2013-242776

(51) Int. Cl.

| F16C 33/46 | (2006.01) |
|---|---|
| F16C 19/36 | (2006.01) |
| F16C 33/51 | (2006.01) |
| F16C 33/58 | (2006.01) |
| F16C 43/08 | (2006.01) |

(52) U.S. Cl.
CPC ............. *F16C 33/467* (2013.01); *F16C 19/364* (2013.01); *F16C 33/4605* (2013.01); *F16C 33/4676* (2013.01); *F16C 33/51* (2013.01); *F16C 33/513* (2013.01); *F16C 33/585* (2013.01); *F16C 43/083* (2013.01)

(58) Field of Classification Search
CPC ...... F16C 29/26; F16C 29/364; F16C 33/366; F16C 33/467; F16C 33/502; F16C 33/586; F16C 33/4605; F16C 33/4694; B21D 53/12

USPC ......... 384/548, 565, 571, 572, 577, 597, 618, 384/580; 29/898.067
See application file for complete search history.

(56) References Cited

U.S. PATENT DOCUMENTS

| 1,513,999 A | * | 11/1924 | Kifer | ............................. 384/572 |
| 2,946,633 A | * | 7/1960 | Gothberg | ...................... 384/576 |
| 3,221,390 A | * | 12/1965 | Pitner | ...................... 29/898.067 |

(Continued)

FOREIGN PATENT DOCUMENTS

| DE | 79 35 207 U1 | 3/1980 | |
| DE | 3336889 A | * 4/1985 | .............. F16C 33/46 |

(Continued)

OTHER PUBLICATIONS

DE 10-2012 207529 Translation.*

(Continued)

Primary Examiner — Marcus Charles
(74) Attorney, Agent, or Firm — Oliff PLC

(57) ABSTRACT

A split cage includes a plurality of cage segments each having a pair of rim portions and a pair of cage bar portions, the cage bar portions and the rim portions defining a single pocket that accommodates a single tapered roller. Turning of each of the cage segments is guided by the tapered roller, the cage segments being arranged in a circular pattern along the circumferential direction of the split cage, in an annular space between inner and outer rings. Each cage segment has projections formed so as to project radially inward from the pocket, and formed at the rim portions. A projecting length of each projection is set to such a length that the projection is brought into contact with an outer peripheral side portion of the inner ring before the cage segment is detached from the tapered roller when the cage segment is displaced to the radially inside.

4 Claims, 14 Drawing Sheets

(56) References Cited

U.S. PATENT DOCUMENTS

| | | | | |
|---|---|---|---|---|
| 4,226,484 | A | * | 10/1980 | Glassow et al. ............... 384/470 |
| 4,557,614 | A | * | 12/1985 | Knappe ......................... 384/573 |
| 4,824,265 | A | * | 4/1989 | Hofmann et al. ............. 384/560 |
| 5,295,749 | A | | 3/1994 | Takahashi et al. |
| 5,352,047 | A | * | 10/1994 | Ingall et al. .................... 384/572 |
| 8,616,776 | B2 | * | 12/2013 | Nakamura et al. ............ 384/470 |
| 2009/0208161 | A1 | * | 8/2009 | Jauernig et al. ............... 384/572 |
| 2010/0215298 | A1 | * | 8/2010 | Zeidlhack ....................... 384/51 |

FOREIGN PATENT DOCUMENTS

| | | | |
|---|---|---|---|
| DE | 10 2012 207 529 A1 | 11/2013 | |
| DE | 102012207529 A1 | * 11/2013 | |
| EP | 1408248 A2 | * 4/2004 | ............. F16C 33/46 |
| EP | 1696143 A2 | * 8/2006 | |
| JP | 2000145790 A | * 5/2000 | ............. F16C 33/46 |
| JP | 2007205557 A | * 8/2007 | |
| JP | 2007-263304 A | 10/2007 | |
| JP | A-2011-133061 | 7/2011 | |
| JP | 2013241959 A | * 12/2013 | |

OTHER PUBLICATIONS

Apr. 7, 2015 Extended European Search Report issued in European Patent Application No. 14194076.7.

* cited by examiner

SPLIT CAGE AND ROLLER BEARING

INCORPORATION BY REFERENCE

The disclosure of Japanese Patent Application No. 2013-242776 filed on Nov. 25, 2013 including the specification, drawings and abstract, is incorporated herein by reference in its entirety.

BACKGROUND OF THE INVENTION

1. Field of the Invention

The invention relates to a split cage and a roller bearing.

2. Description of the Related Art

As a cage that holds a plurality of rollers, which roll between an inner ring and an outer ring of a roller bearing, at prescribed intervals along the circumferential direction of the cage, there is a conventional split cage formed of a plurality of cage segments arranged in the circumferential direction (refer to, for example, Japanese Patent Application Publication No. 2011-133061). As this type of split cage, there is often adopted a cage of a roller guidance type, of which the turning is guided by rollers in order to prevent abrasion of the cage due to contact with inner and outer rings. In a split cage of the roller guidance type, each cage segment has a pocket that accommodates a roller, and each pocket has an insertion opening through which the roller is inserted into the pocket from one of the radially outside and the radially inside.

In the split cage of the roller guidance type, a single roller is accommodated in a single pocket of each cage segment. Thus, when the cage segment is displaced to the other one of the radially outside and the radially inside due to, for example, vibrations, that is, when the insertion opening of the cage segment is displaced in such a direction that the roller comes out of the insertion opening, there is a possibility that the cage segment may be detached from the roller to cause breakage of the cage segment.

SUMMARY OF THE INVENTION

One object of the invention is to provide a split cage and a roller bearing that are configured to prevent a cage segment from being detached from a roller to cause breakage of the cage segment.

A split cage according to an aspect of the invention includes a plurality of cage segments, each of the cage segments having a pair of rim portions that face each other at a prescribed distance in an axial direction of the split cage, and a pair of cage bar portions disposed between the rim portions to connect the rim portions to each other, the cage bar portions and the rim portions defining a single pocket that accommodates a single roller, the pocket having an insertion opening through which the roller is inserted into the pocket from one of a radially outside and a radially inside. Turning of each of the cage segments is guided by the roller, the cage segments being arranged in a circular pattern along a circumferential direction of the split cage, in an annular space between an inner ring and an outer ring. Each of the cage segments has projections formed so as to project toward the other one of the radially outside and the radially inside, the projections being formed at both the rim portions and the cage bar portions, or at the rim portions or the cage bar portions. A projecting length of each of the projections is set to such a length that the projections are brought into contact with an outer peripheral side portion of the inner ring or an inner peripheral side portion of the outer ring, which is located on the other one of the radially outside and the radially inside, before the cage segment is detached from the roller when the cage segment is displaced to the other one of the radially outside and the radially inside.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 6A and FIG. 6B illustrate the state where the cage segment starts rotating in one direction, wherein FIG. 6A is a side view and FIG. 6B is a sectional view;

FIG. 7A and FIG. 7B illustrate the state where the cage segment starts rotating in the other direction, wherein FIG. 7A is a side view and FIG. 7B is a sectional view;

FIG. 8A and FIG. 8B illustrate the state where the cage segment is displaced radially inward, wherein FIG. 8A is a side view and FIG. 8B is a sectional view;

DETAILED DESCRIPTION OF EMBODIMENTS

Figure 1:
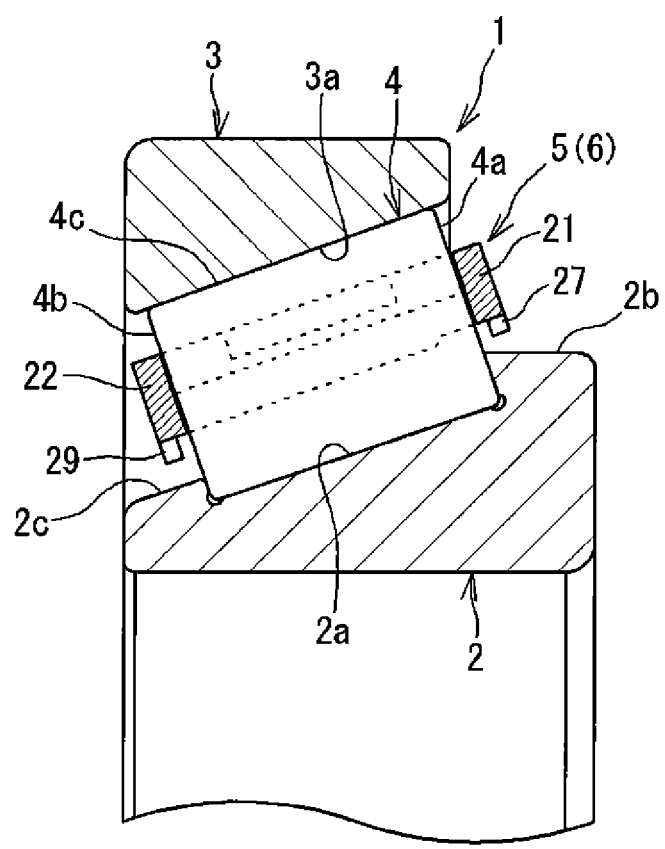
FIG. 1 is a sectional view illustrating main portions of a tapered roller bearing provided with a split cage according to a first embodiment of the invention.

Hereinafter, example embodiments of the invention will be described in detail with reference to the accompanying drawings. FIG. 1 is a sectional view illustrating main portions of a tapered roller bearing 1 provided with a split cage 5 according to a first embodiment of the invention. The tapered roller bearing 1 according to the present embodiment includes an inner ring 2, an outer ring 3, a plurality of tapered rollers 4 and the split cage 5. The tapered rollers 4 are rollably disposed in an annular space between the inner ring 2 and the outer ring 3. The split cage 5 holds the tapered rollers 4.

The inner periphery of the outer ring 3 has an outer ring raceway surface 3a, which is a tapered face, such that the tapered rollers 4 roll. The outer periphery of the inner ring 2 has an inner ring raceway surface 2a, which is a taped face, at such a position that the inner ring raceway surface 2a faces the outer ring raceway surface 3a such that the tapered rollers 4 roll. Lubricant such as grease is applied to the total circumference of each of the outer ring raceway surface 3a and the inner ring raceway surface 2a. The outer periphery of the inner ring 2 has a large rib portion 2b and a small rib portion 2c disposed across the inner ring raceway surface 2a. The large rib portion 2b projects radially outward and is in contact with a first end face 4a of the tapered roller 4, which is located on one side in the axial direction. The small rib portion 2c projects radially outward and may be in contact with a second end face 4b of the tapered roller 4, which is located on the other side in the axial direction.

Figure 2:
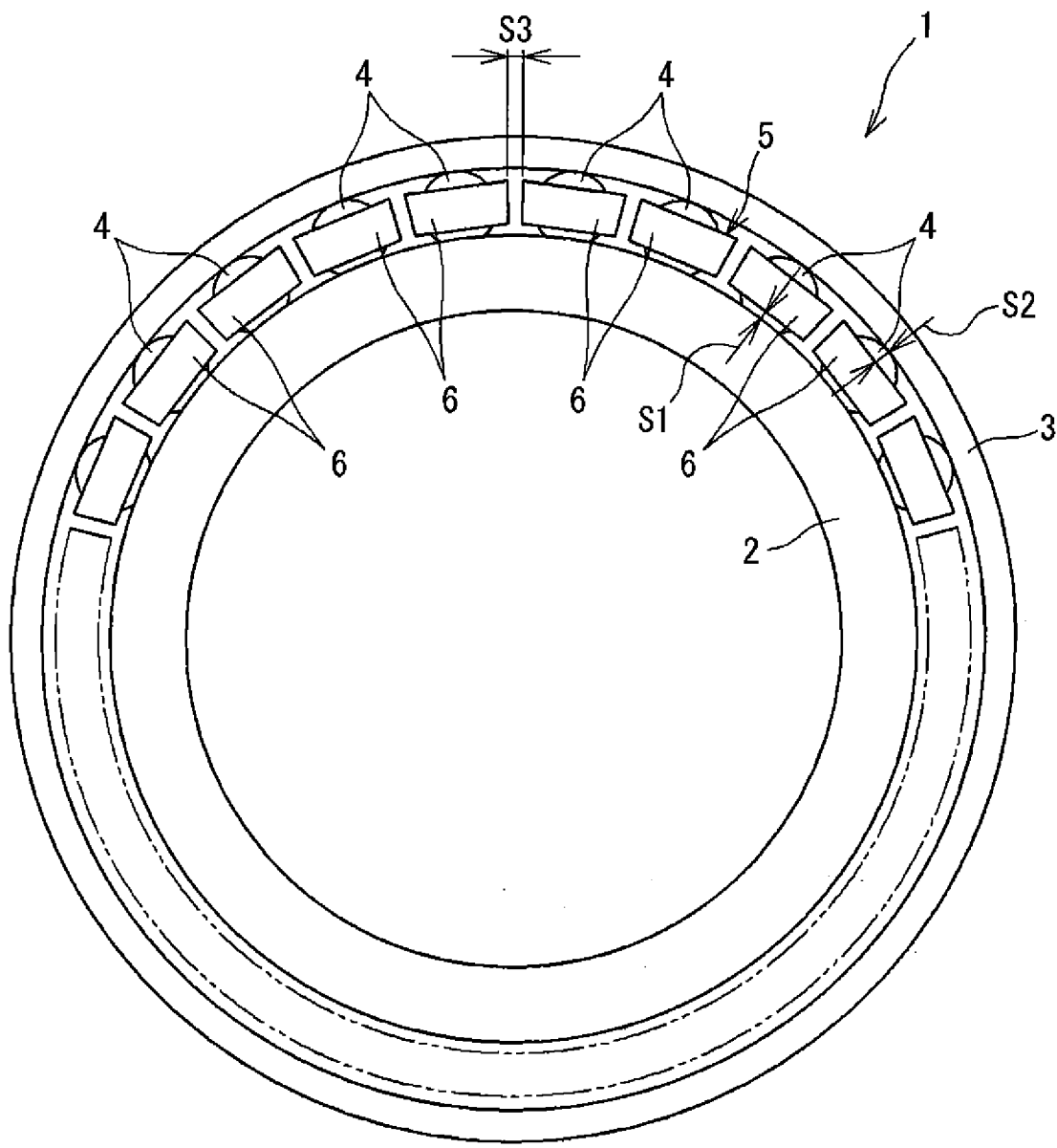
FIG. 2 is a side view illustrating the tapered roller bearing.
Figure 3:
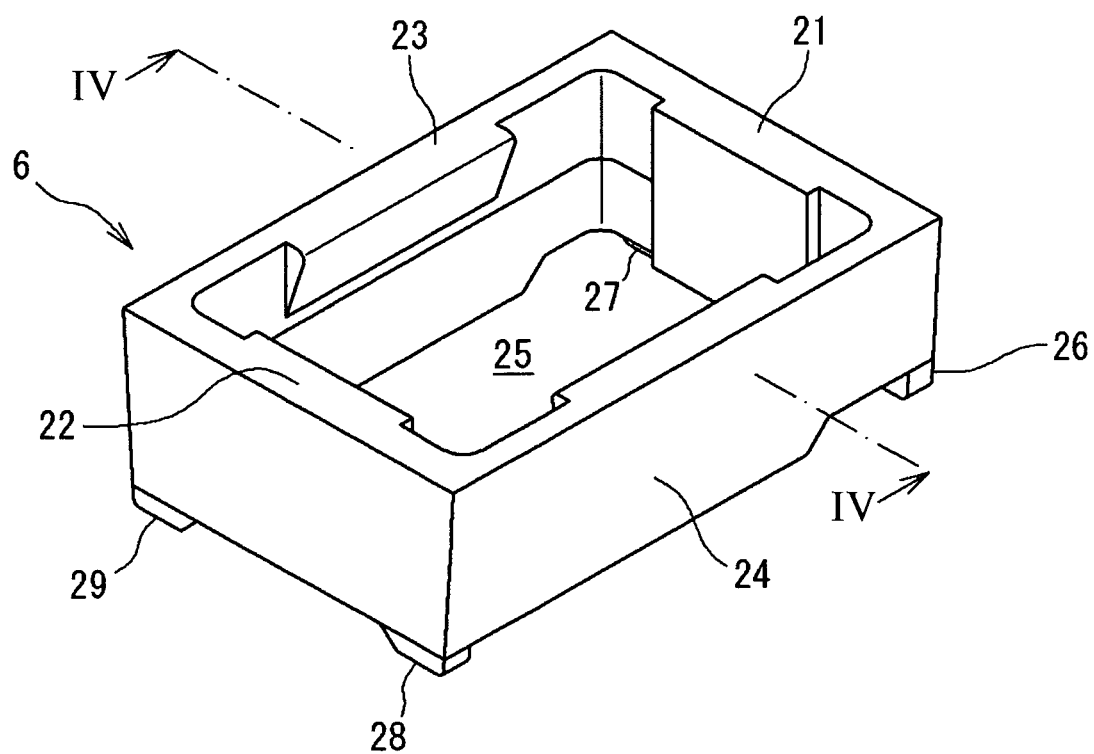
FIG. 3 is a perspective view illustrating one of cage segments that constitute the split cage.

FIG. 2 is a side view illustrating the tapered roller bearing 1. FIG. 3 is a perspective view illustrating one of cage segments 6 that constitute the split cage 5. The split cage 5 is formed by arranging, in a circular pattern, a plurality of the cage segments 6 along the circumferential direction in an annular space between the inner ring 2 and the outer ring 3. Turning of each cage segment 6 is guided by the tapered roller 4. Thus, a prescribed clearance S1 in the radial direction is formed between the radially inner face of each of the cage segments 6 and the outer peripheral face of the inner ring 2, and a prescribed clearance S2 in the radial direction is formed between the radially outer face of each of the cage segments 6 and the inner peripheral face of the outer ring 3. In addition, a prescribed clearance S3 in the circumferential direction is formed between the cage segments 6 that are adjacent to each other.

Each cage segment 6 is a single-piece member formed by molding synthetic resin into a rectangular frame shape by injection molding. Each cage segment 6 has a first rim portion 21, a second rim portion 22, a first cage bar portion 23, and a second cage bar portion 24. The first rim portion 21 and the second rim portion 22 face each other at a prescribed distance in the axial direction. Each of the first cage bar portion 23 and the second cage bar portion 24 is disposed between the first rim portion 21 and the second rim portion 22 to connect the first rim portion 21 and the second rim portion 22 to each other. Each cage segment 6 has a single pocket 25 that accommodates a single tapered roller 4, and that is defined by the rim portions 21, 22, and the cage bar portions 23, 24.

Figure 4:
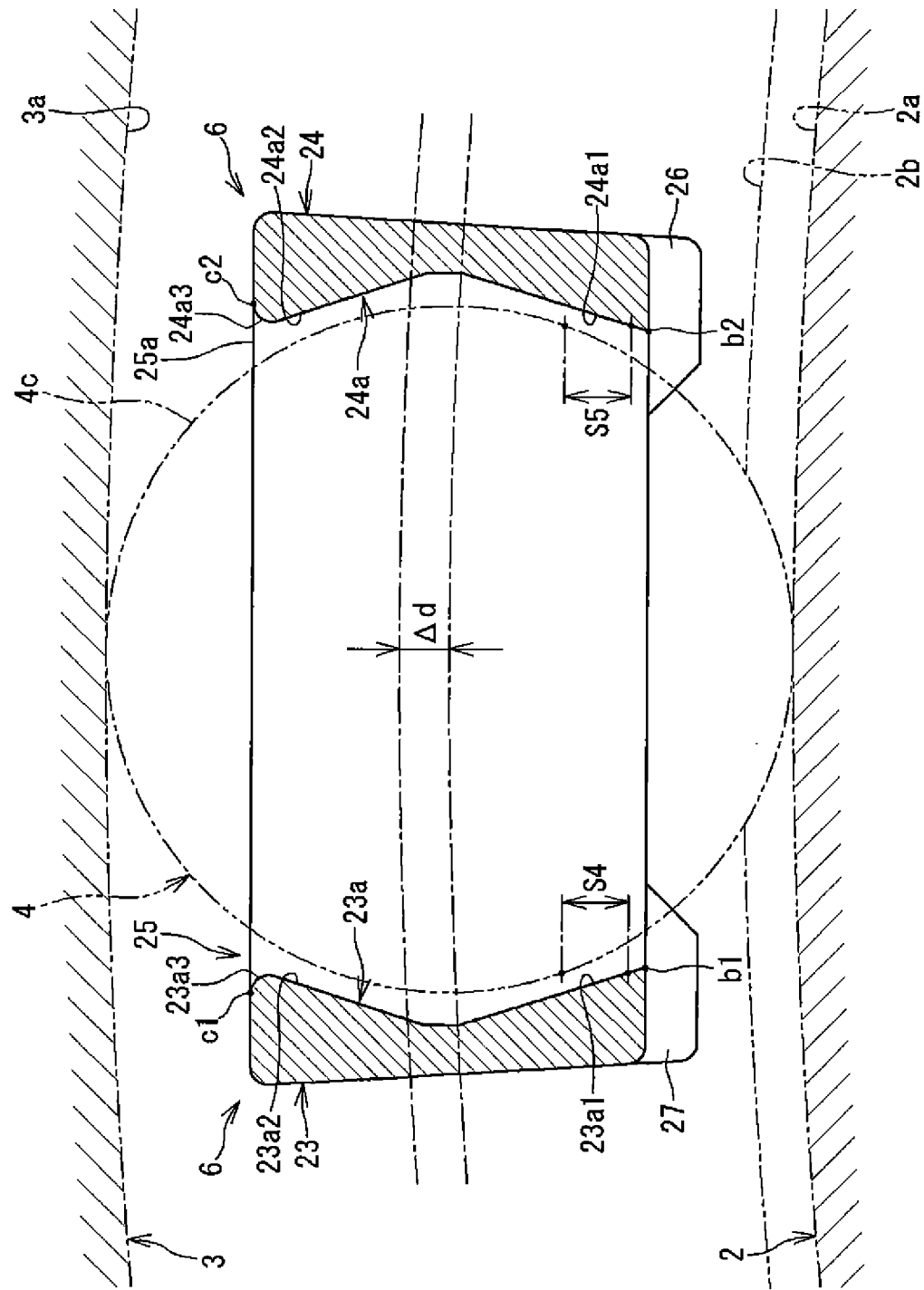
FIG. 4 is a sectional view taken along the line IV-IV in FIG. 3.

FIG. 4 is a sectional view taken along the line A-A in FIG. 3. As illustrated in FIG. 3 and FIG. 4, an insertion opening 25a is formed at a radially outer side portion of the pocket 25, and the tapered roller 4 is inserted, from the radially outside, into the pocket 25 through the insertion opening 25a. The cage bar portions 23, 24 have pocket-side faces 23a, 24a (described later), respectively, and roundly-chamfered portions 23a3, 24a3 are formed at radially outer end portions of the pocket-side faces 23a, 24a, respectively, to allow the tapered roller 4 to be easily inserted into the pocket 25 through the insertion opening 25a.

Pocket 25-side side faces of the cage bar portions 23, 24 are respectively used as the pocket-side faces 23a, 24a that can be in sliding contact with an outer peripheral face 4c of the tapered roller 4. The pocket-side faces 23a, 24a have inner tilted faces 23a1, 24a1, and outer tilted faces 23a2, 24a2 that are located radially outward of the inner tilted faces 23a1, 24a1, respectively.

The inner tilted faces 23a1, 24a1 are formed so as to be tilted such that part of each of the inner tilted faces 23a1, 24a1 except radially inner ends b1, b2 of the pocket-side faces 23a, 24a is in line contact with the outer peripheral face 4c of the tapered roller 4. The outer tilted faces 23a2, 24a2 are formed so as to be tilted such that part of each of the outer tilted faces 23a2, 24a2 except radially outer ends c1, c2 of the pocket-side faces 23a, 24a is in line contact with the outer peripheral face 4c of the tapered roller 4.

Thus, in normal times, the outer peripheral face 4c of the tapered roller 4 is brought into contact with the inner tilted faces 23a1, 24a1 and the outer tilted face 23a2, 24a2, and it is therefore possible to prevent the tapered roller 4 from being brought into contact with the radially inner ends b1, b2 and the radially outer ends c1, c2 of the pocket-side faces 23a, 24a. As a result, it is possible to prevent breakage of the cage segment 6 due to contact of the tapered roller 4 with the radially inner ends b1, b2 and the radially outer ends c1, c2 of the pocket-side faces 23a, 24a.

As illustrated in FIG. 4, radial clearances S4, S5 are formed between the inner tilted faces 23a1, 24a1 that are radially inner portions of the pocket-side faces 23a, 24a, respectively, and the outer peripheral face 4c of the tapered roller 4. The radial clearances S4, S5 are each set larger than a change amount $\Delta d$ of a pitch circle radius of the cage segment 6 when the cage segment 6 is displaced radially outward (upward in FIG. 4) due to thermal expansion.

Figure 5:
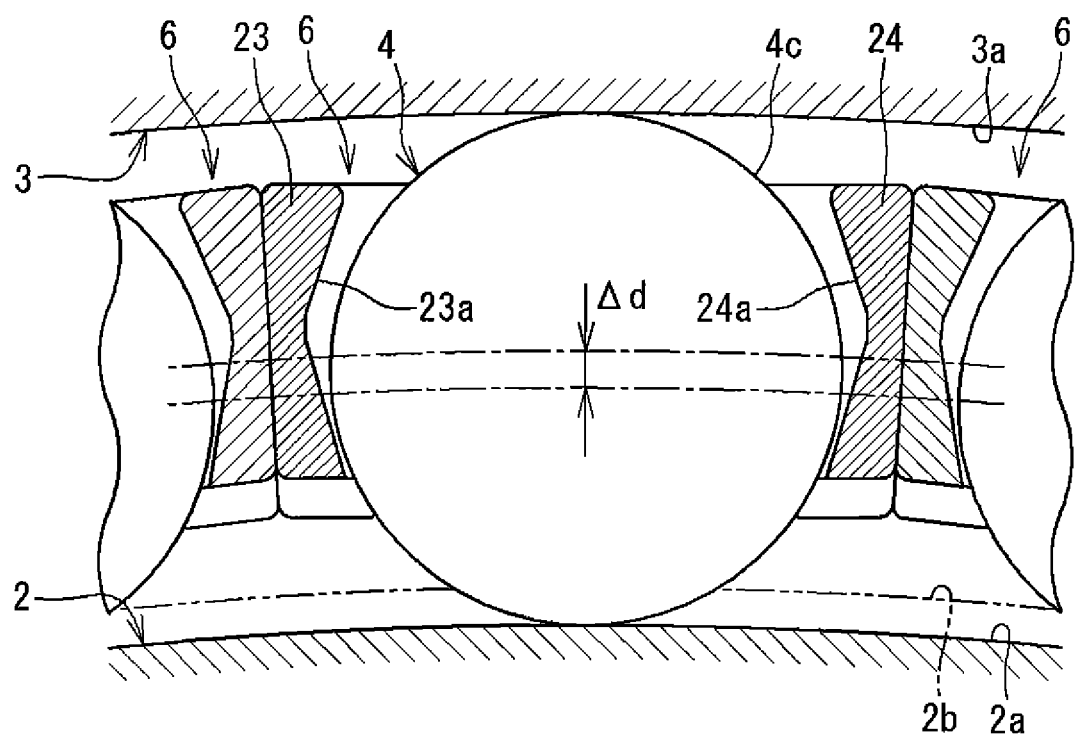
FIG. 5 is a sectional view illustrating the state where the cage segment is displaced radially outward due to thermal expansion.

As a result, as illustrated in FIG. 5, even if the cage segment 6 is displaced radially outward by the change amount $\Delta d$ due to thermal expansion, a radial clearance still remains between the inner tilted faces 23a1, 24a1 of the pocket-side faces 23a, 24a and the outer peripheral face 4c of the tapered roller 4. Thus, it is possible to prevent the inner tilted faces 23a1, 24a1 from being pushed by the outer peripheral face 4c of the tapered roller 4. Thus, even if clearance loss occurs, that is, the clearance S3 between the adjacent cage segments 6 in the circumferential direction (refer to FIG. 2) is eliminated due to thermal expansion of the cage segments 6 and the cage segment 6 is displaced radially outward, it is possible to prevent occurrence of abnormal abrasion of the pocket-side faces 23a, 24a of the cage segment 6.

As illustrated in FIG. 3, a first projection 26 and a second projection 27 that project radially inward are formed integrally with respective longitudinal (circumferential) end portions of the radially inner face of the first rim portion 21 of the cage segment 6. Similarly, a third projection 28 and a fourth projection 29 that project radially inward are formed integrally with respective longitudinal (circumferential) end portions of the radially inner face of the second rim portion 22 of the cage segment 6.

Figure 6A:
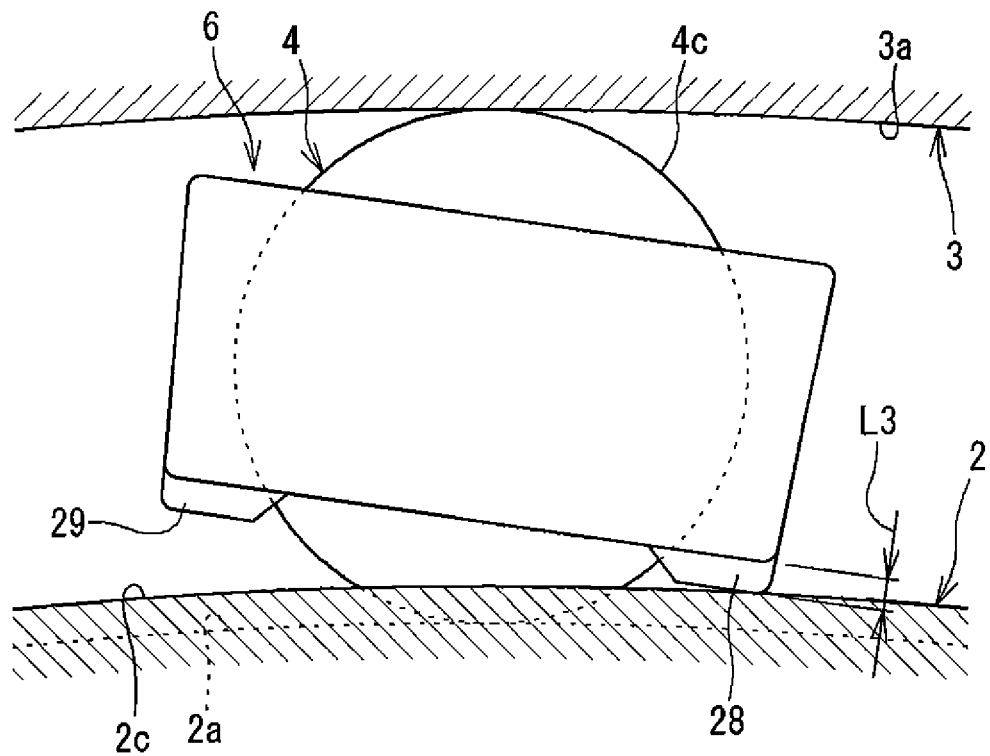
Figure 6B:
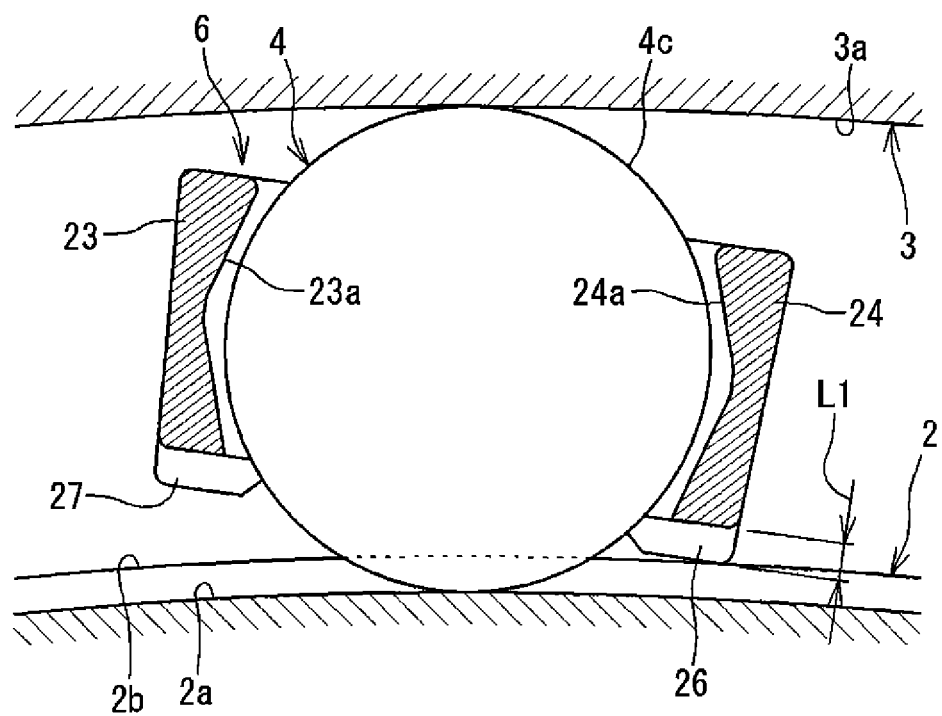

FIG. 6A and FIG. 6B illustrate the state where the cage segment 6 starts rotating in one direction. FIG. 6A is a side view, and FIG. 6B is a sectional view. As illustrated in FIG. 6B, a projecting length L1 of the first projection 26 is set to such a length that the first projection 26 is brought into contact with the outer peripheral face of the large rib portion 2b of the inner ring 2 when the cage segment 6 starts rotating in one direction (clockwise direction in FIG. 6B) about the axis of the tapered roller 4. In addition, as illustrated in FIG. 6A, a projecting length L3 of the third projection 28 is set to such a length that the third projection 28 is brought into contact with the outer peripheral face of the small rib portion 2c of the inner ring 2 when the cage segment 6 starts rotating in the one direction.

Thus, when the cage segment 6 starts rotating in the one direction, the first projection 26 and the third projection 28 are brought into contact with the outer peripheral faces of the large rib portion 2b and the small rib portion 2c of the inner ring 2, respectively. As a result, it is possible to prevent the cage segment 6 from further rotating in the one direction. Thus, it is possible to prevent the cage segment 6 from being entangled with the tapered roller 4 due to the rotation of the cage segment 6 to cause breakage of the cage segment 6.

Figure 7A:
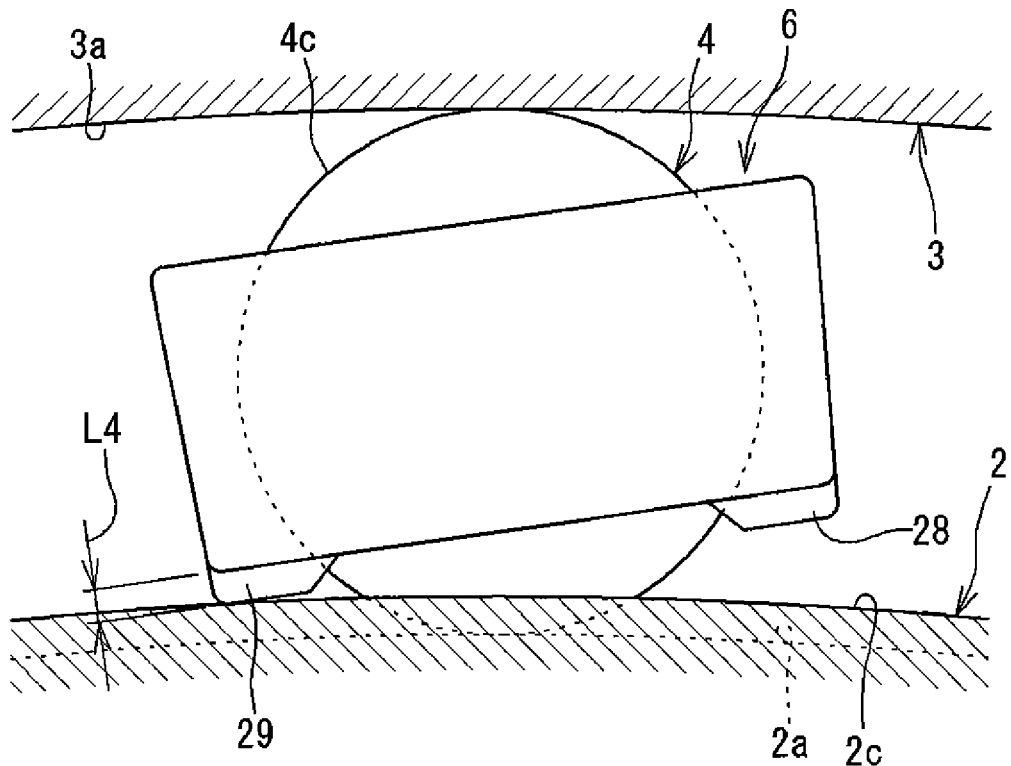
Figure 7B:
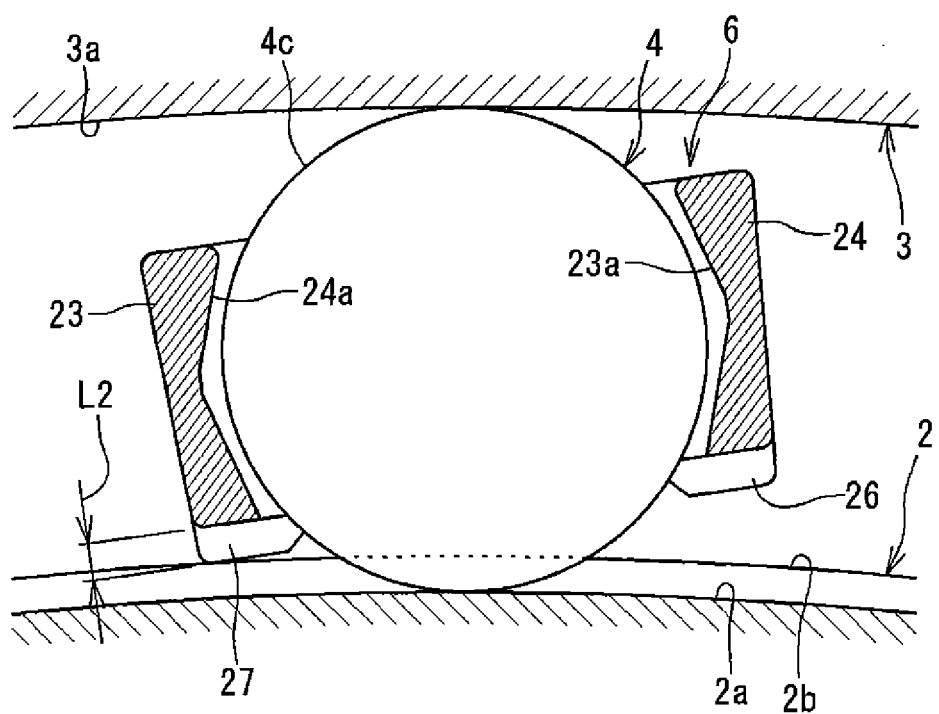

FIG. 7A and FIG. 7B illustrate the state where the cage segment 6 starts rotating in the other direction. FIG. 7A is a side view, and FIG. 7B is a sectional view. As illustrated in FIG. 7B, a projecting length L2 of the second projection 27 is set to such a length that the second projection 27 is brought into contact with the outer peripheral face of the large rib portion 2b of the inner ring 2 when the cage segment 6 starts rotating in the other direction (counterclockwise direction in FIG. 7B) about the axis of the tapered roller 4. In addition, as illustrated in FIG. 7A, a projecting length L4 of the fourth projection 29 is set to such a length that the fourth projection 29 is brought into contact with the outer peripheral face of the small rib portion 2c of the inner ring 2 when the cage segment 6 starts rotating in the other direction.

Thus, when the cage segment 6 starts rotating in the other direction, the second projection 27 and the fourth projection 29 are brought into contact with the outer peripheral faces of the large rib portion 2b and the small rib portion 2c of the inner ring 2, respectively. As a result, it is possible to prevent the cage segment 6 from further rotating in the other direction. Thus, it is possible to prevent the cage segment 6 from being entangled with the tapered roller 4 due to the rotation of the cage segment 6 to cause breakage of the cage segment 6.

Figure 8A:
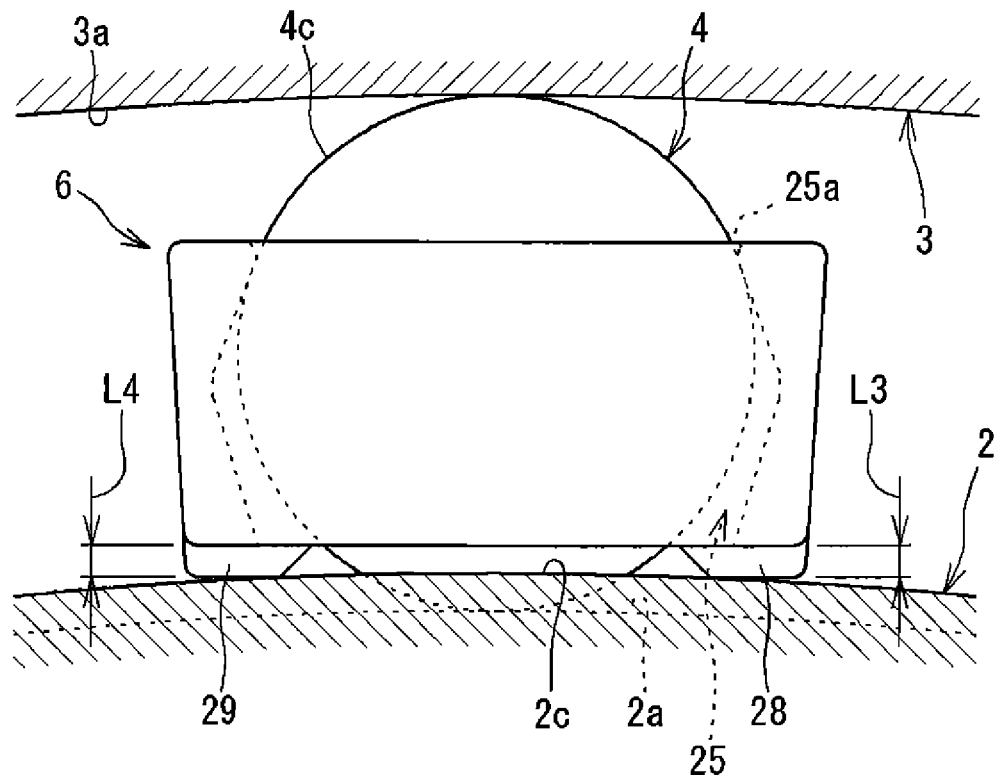
Figure 8B:
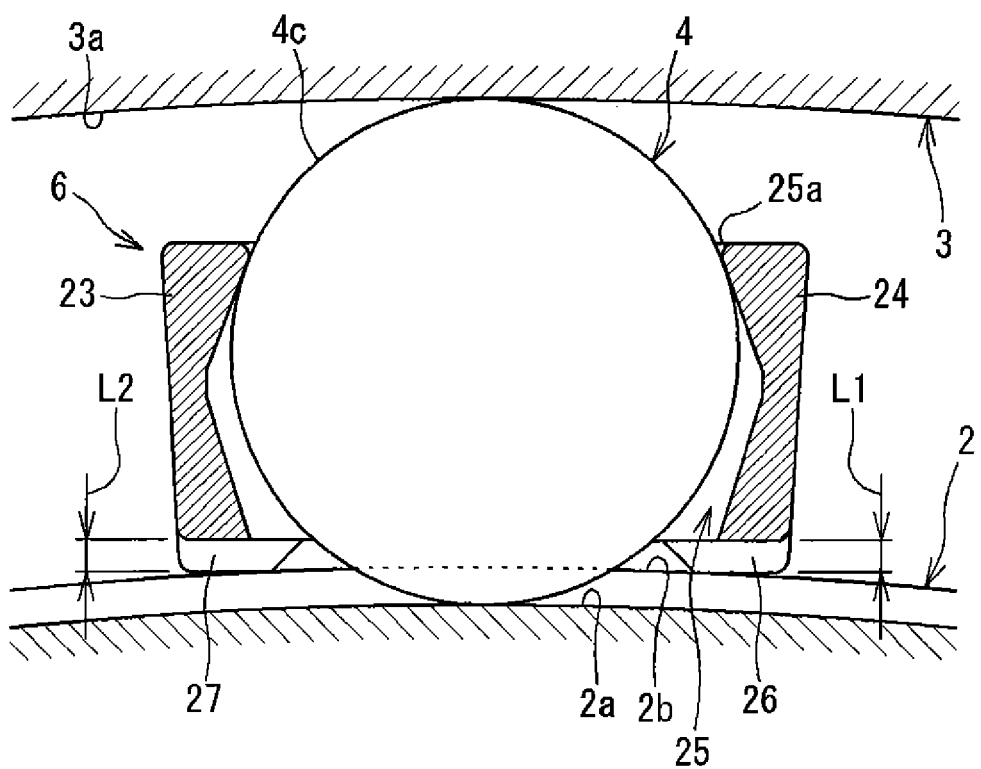

FIG. 8A and FIG. 8B illustrate the state where the cage segment 6 is displaced radially inward. FIG. 8A is a side view, and FIG. 8B is a sectional view. As illustrated in FIG. 8B, each of the projecting lengths L1, L2 of the first and second projections 26, 27 is set to such a length that the first and second projections 26, 27 are brought into contact with the outer peripheral face of the large rib portion 2b of the inner ring 2 before the cage segment 6 is detached from the tapered roller 4, when the cage segment 6 is displaced radially inward, that is, when the insertion opening 25a of the pocket 25 is displaced in such a direction that the tapered roller 4 comes out of the insertion opening 25a. Similarly, as illustrated in FIG. 8A, each of the projecting lengths L3, L4 of the third and fourth projections 28, 29 is set to such a length that the third and fourth projections 28, 29 are brought into contact with the outer peripheral face of the small rib portion 2c of the inner ring 2 before the cage segment 6 is detached from the tapered roller 4, when the cage segment 6 is displaced radially inward.

Thus, when the cage segment 6 is displaced radially inward due to, for example, vibrations, the first and second projections 26, 27 and the third and fourth projections 28, 29 are brought into contact with the outer peripheral face of the large rib portion 2b of the inner ring 2 and the outer peripheral face of the small rib portion 2c of the inner ring 2, respectively, before the cage segment 6 is detached from the tapered roller 4. As a result, it is possible to prevent the cage segment 6 from being detached from the tapered roller 4 to cause breakage of the cage segment 6.

When the cage segment 6 starts rotating, or when the cage segment 6 is displaced radially inward due to, for example, vibrations, the first and second projections 26, 27 and the third and fourth projections 28, 29 are brought into contact with the outer peripheral face of the large rib portion 2b of the inner ring 2 and the outer peripheral face of the small rib portion 2c of the inner ring 2, respectively, Thus, it is possible to prevent lubricant on the inner ring raceway surface 2a from being peeled off by the first to fourth projections 26 to 29.

Figure 9:
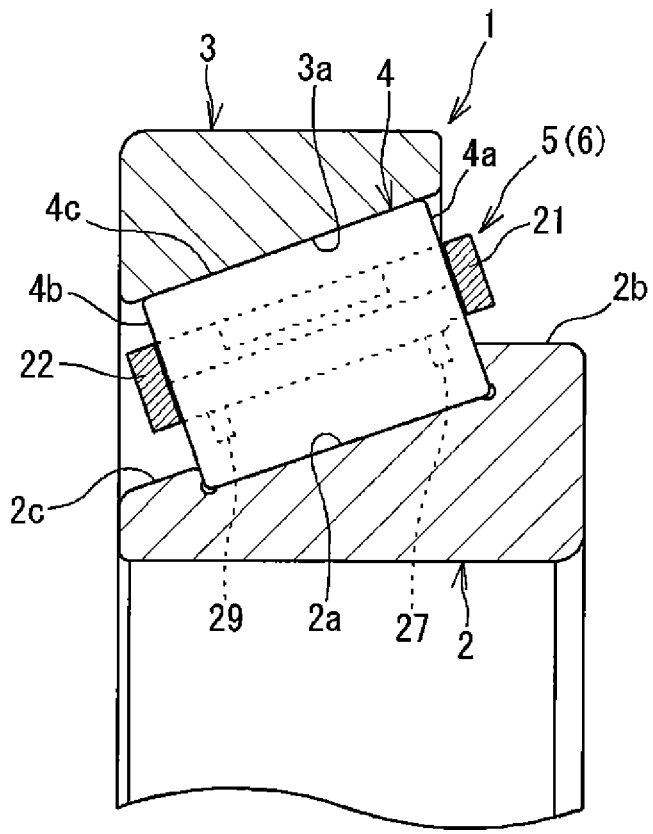
FIG. 9 is a sectional view illustrating main portions of a tapered roller bearing provided with a split cage according to a second embodiment of the invention.
Figure 10:
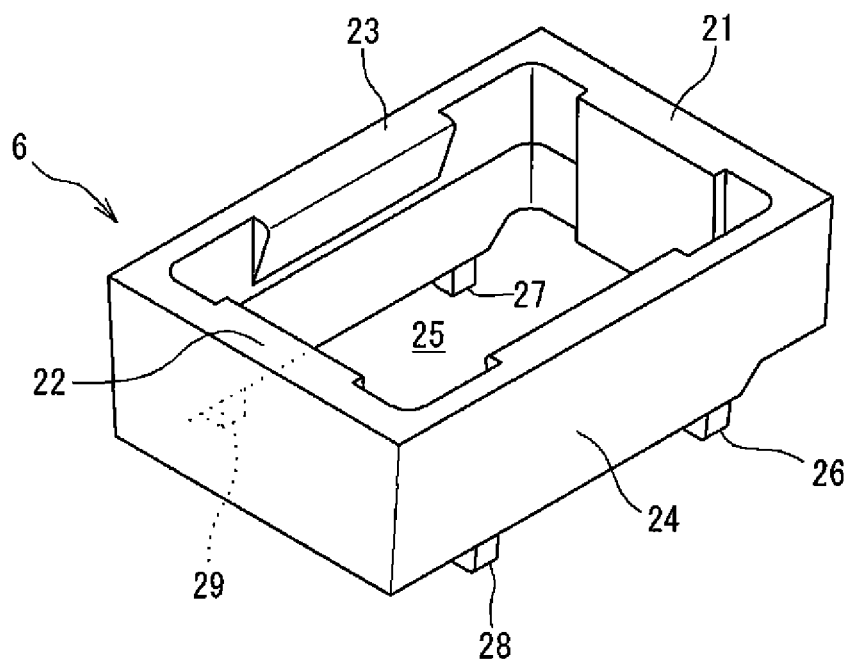
FIG. 10 is a perspective view illustrating one of cage segments that constitute the split cage according to the second embodiment.

FIG. 9 is a sectional view illustrating main portions of a tapered roller bearing 1 provided with a split cage 5 according to a second embodiment of the invention. FIG. 10 is a perspective view illustrating one of cage segments 6 that constitute the split cage 5. In the cage segment 6 according to the present embodiment, first and third projections 26, 28 and second and fourth projections 27, 29 are formed so as to project from the radially inner face of the second cage bar portion 24 and the radially inner face of the first cage bar portion 23, respectively. Specifically, the second projection 27 and the fourth projection 29 that project radially inward are formed integrally with respective longitudinal (axial) end portions of the radially inner face of the first cage bar portion 23. Similarly, the first projection 26 and the third projection 28 that project radially inward are formed integrally with respective longitudinal (axial) end portions of the radially inner face of the second cage bar portion 24.

Figure 11A:
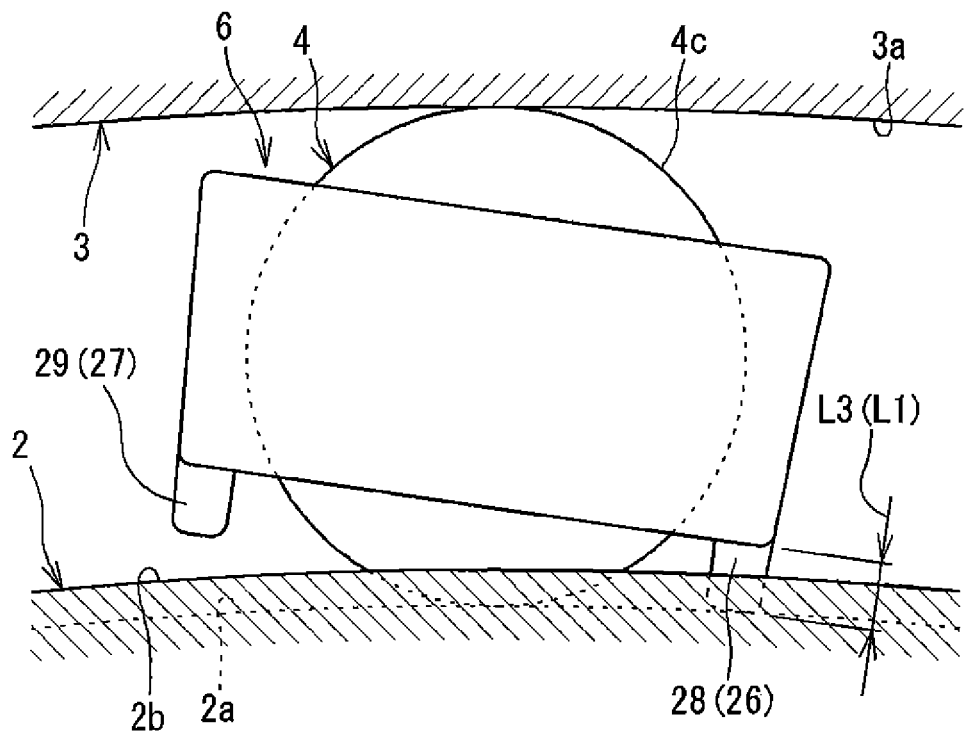
FIG. 11A is a side view illustrating the state where the cage segment according to the second embodiment starts rotating in one direction.

FIG. 11A is a side view illustrating the state where the cage segment 6 according to the present embodiment starts rotating in one direction. As illustrated in FIG. 11A, each of the projecting lengths L1, L3 of the first and third projections 26, 28 is set to such a length that the first and third projections 26, 28 are brought into contact with the inner ring raceway surface 2a when the cage segment 6 starts rotating in one direction (clockwise direction in FIG. 11A) about the axis of the tapered roller 4. Thus, when the cage segment 6 starts rotating in the one direction, the first projection 26 and the third projection 28 are brought into contact with the inner ring raceway surface 2a. As a result, it is possible to prevent the cage segment 6 from further rotating in the one direction.

Figure 11B:
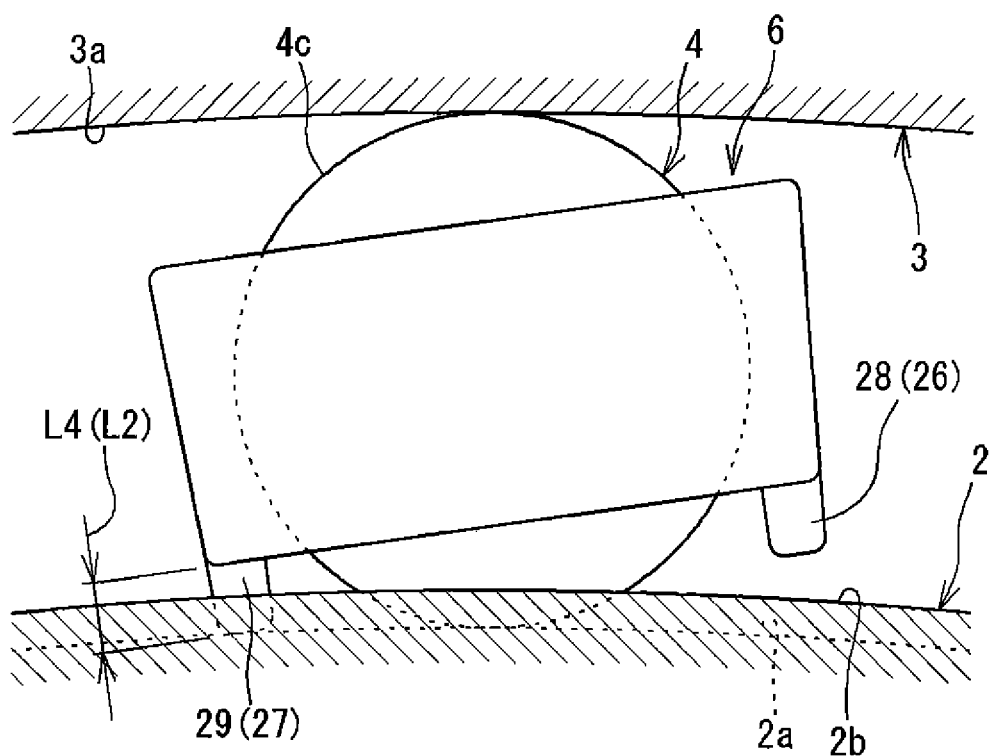
FIG. 11B is a side view illustrating the state where the cage segment according to the second embodiment starts rotating in the other direction.

FIG. 11B is a side view illustrating the state where the cage segment 6 according to the present embodiment starts rotating in the other direction. As illustrated in FIG. 11B, each of the projecting lengths L2, L4 of the second and fourth projections 27, 29 is set to such a length that the second and fourth projections 27, 29 are brought into contact with the inner ring raceway surface 2a when the cage segment 6 starts rotating in the other direction (counterclockwise direction in FIG. 11B) about the axis of the tapered roller 4. Thus, when the cage segment 6 starts rotating in the other direction, the second projection 27 and the fourth projection 29 are brought into contact with the inner ring raceway surface 2a. As a result, it is possible to prevent the cage segment 6 from further rotating in the other direction.

Figure 12:
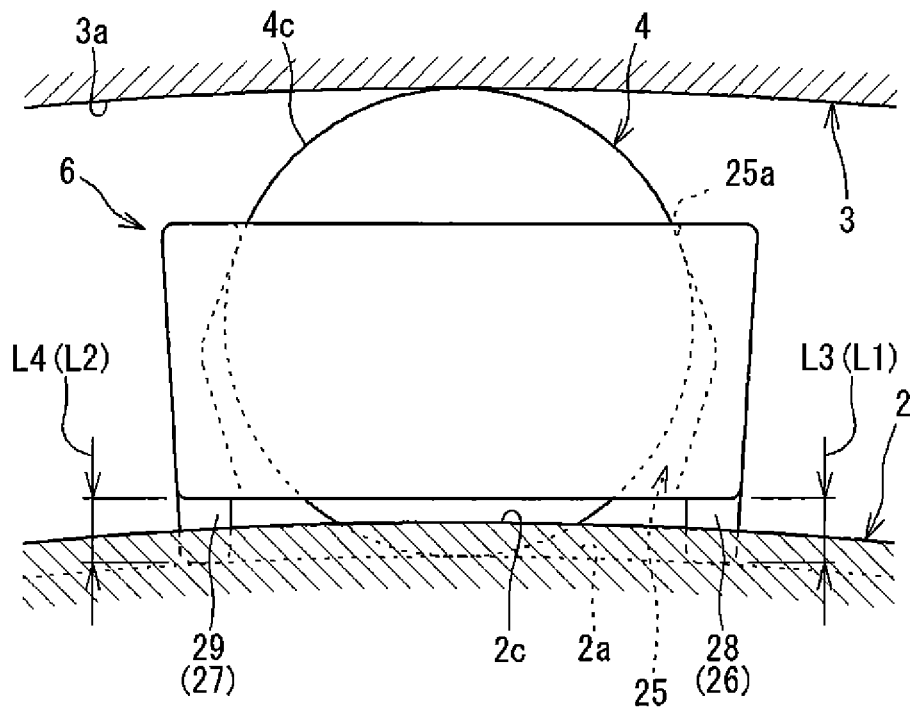
FIG. 12 is a side view illustrating the state where the cage segment according to the second embodiment is displaced radially inward.

FIG. 12 is a side view illustrating the state where the cage segment 6 is displaced radially inward. As illustrated in FIG. 12, each of the projecting lengths L1 to L4 of the first to fourth projections 26 to 29 is set to such a length that the first to fourth projections 26 to 29 are brought into contact with the inner ring raceway surface 2a before the cage segment 6 is detached from the tapered roller 4, when the cage segment 6 is displaced radially inward.

Thus, when the cage segment 6 is displaced radially inward due to, for example, vibrations, the first to fourth projections 26 to 29 are brought into contact with the inner ring raceway surface 2a before the cage segment 6 is detached from the tapered roller 4. As a result, it is possible to prevent the cage segment 6 from being detached from the tapered roller 4 to cause breakage of the cage segment 6. Note that, the features that are not described in the second embodiment are the same as those in the first embodiment.

Figure 13:
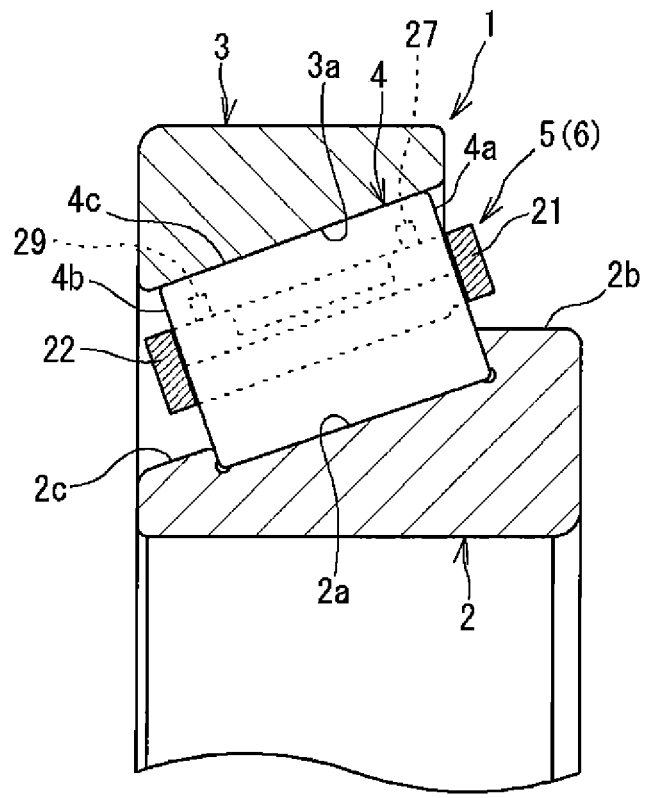
FIG. 13 is a sectional view illustrating main portions of a tapered roller bearing provided with a split cage according to a third embodiment of the invention.
Figure 14:
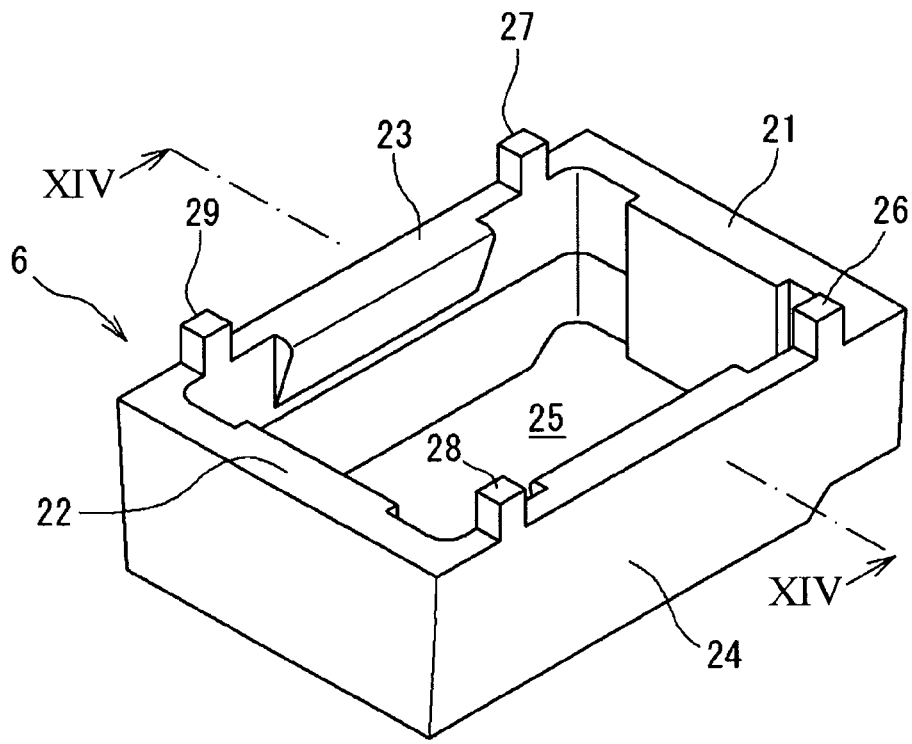
FIG. 14 is a perspective view illustrating one of cage segments that constitute the split cage according to the third embodiment.

FIG. 13 is a sectional view illustrating main portions of a tapered roller bearing 1 provided with a split cage 5 according to a third embodiment of the invention. FIG. 14 is a perspective view illustrating one of cage segments 6 that constitute the split cage 5. In the cage segment 6 according to the present embodiment, first and third projections 26, 28 and second and fourth projections 27, 29 are formed so as to project from the radially outer face of the second cage bar portion 24 and the radially outer face of the first cage bar portion 23, respectively. Specifically, the second projection 27 and the fourth projection 29 that project radially outward are formed integrally with respective longitudinal (axial) end portions of the radially outer face of the first cage bar portion 23. Similarly, the first projection 26 and the third projection 28 that project radially outward are formed integrally with respective longitudinal (axial) end portions of the radially outer face of the second cage bar portion 24.

Figure 15:
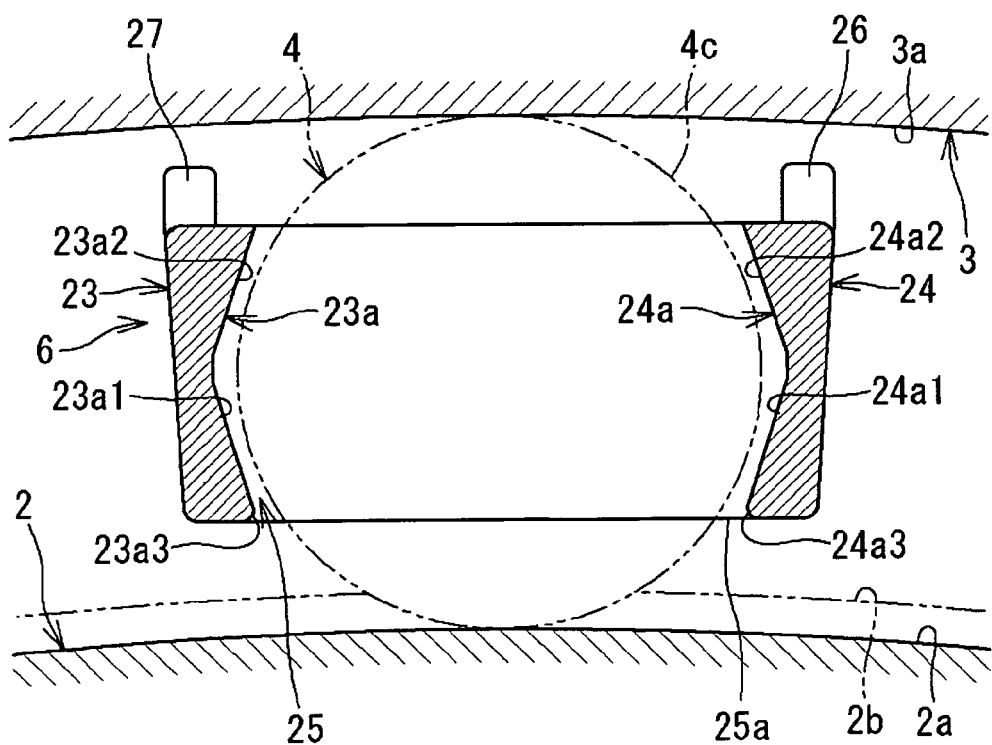
FIG. 15 is a sectional view taken along the line XIV-XIV in FIG. 14.

FIG. 15 is a sectional view taken along the line B-B in FIG. 14. As illustrated in FIG. 14 and FIG. 15, an insertion opening 25a is formed at a radially inner side portion of the pocket 25, and the tapered roller 4 is inserted, from the radially inside, into the pocket 25 through the insertion opening 25a. The cage bar portions 23, 24 have pocket-side faces 23a, 24a, respectively, and roundly-chamfered portions 23a3, 24a3 are formed at radially inner end portions of the pocket-side faces 23a, 24a, respectively, to allow the tapered roller 4 to be easily inserted into the pocket 25 through the insertion opening 25a.

Figure 16A:
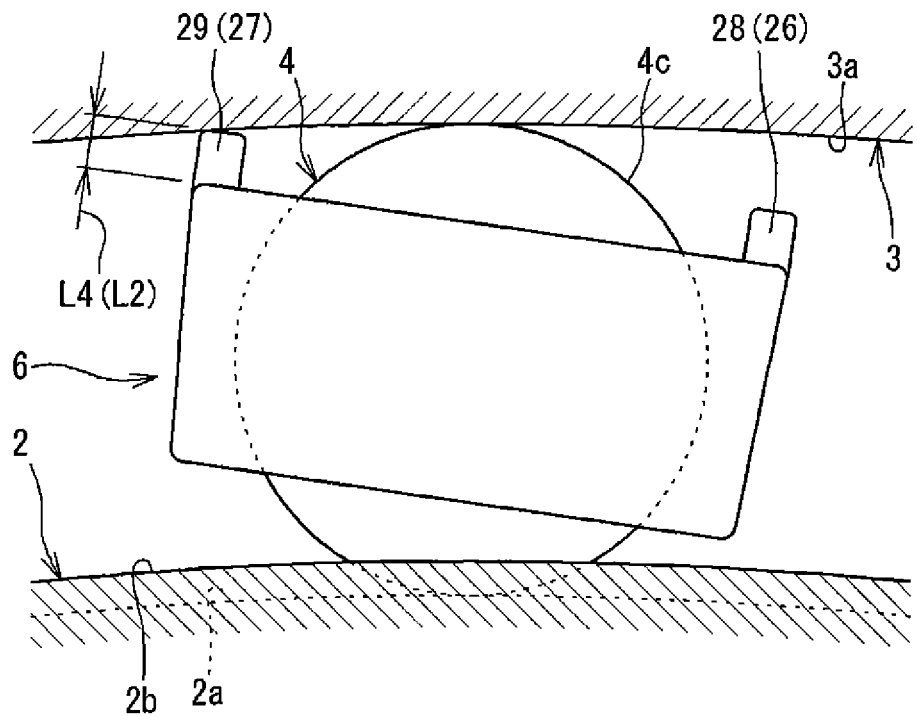
FIG. 16A is a side view illustrating the state where the cage segment according to the third embodiment starts rotating in one direction.

FIG. 16A is a side view illustrating the state where the cage segment 6 according to the present embodiment starts rotating in one direction. As illustrated in FIG. 16A, each of projecting lengths L2, L4 of the second and fourth projections 27, 29 is set to such a length that the second and fourth projections 27, 29 are brought into contact with the outer ring raceway surface 3a when the cage segment 6 starts rotating in one direction (clockwise direction in FIG. 16A) about the axis of the tapered roller 4. Thus, when the cage segment 6 starts rotating in the one direction, the second projection 27 and the fourth projection 29 are brought into contact with the outer ring raceway surface 3a. As a result, it is possible to prevent the cage segment 6 from further rotating in the one direction.

Figure 16B:
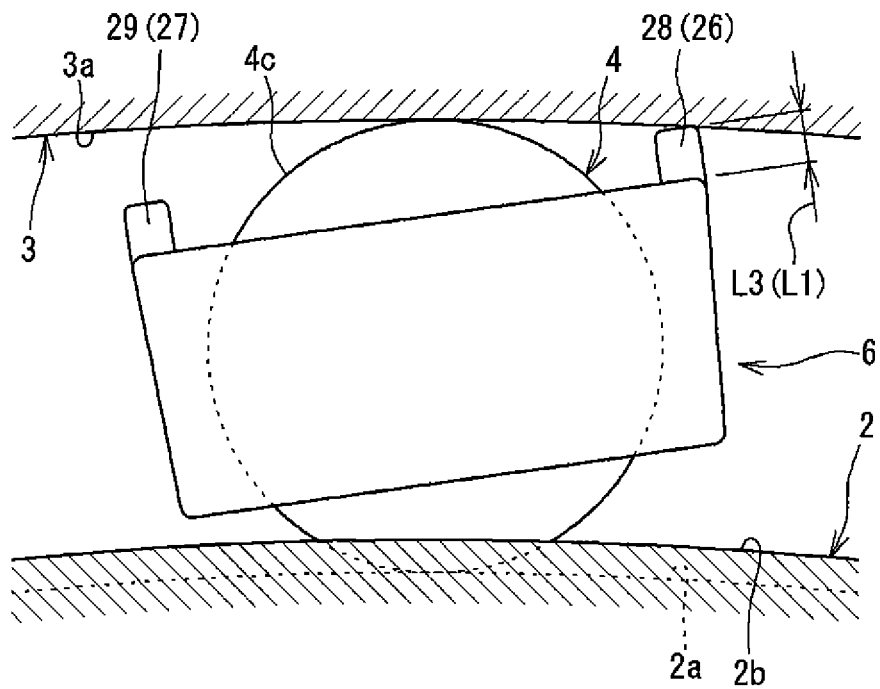
FIG. 16B is a side view illustrating the state where the cage segment according to the third embodiment starts rotating in the other direction.

FIG. 16B is a side view illustrating the state where the cage segment 6 according to the present embodiment starts rotating in the other direction. As illustrated in FIG. 16B, each of projecting lengths L1, L3 of the first and third projections 26, 28 is set to such a length that the first and third projections 26, 28 are brought into contact with the outer ring raceway surface 3a, when the cage segment 6 starts rotating in the other direction (counterclockwise direction in FIG. 16B) about the axis of the tapered roller 4. Thus, when the cage segment 6 starts rotating in the other direction, the first projection 26 and the third projection 28 are brought into contact with the outer ring raceway surface 3a. As a result, it is possible to prevent the cage segment 6 from further rotating in the other direction.

Figure 17:
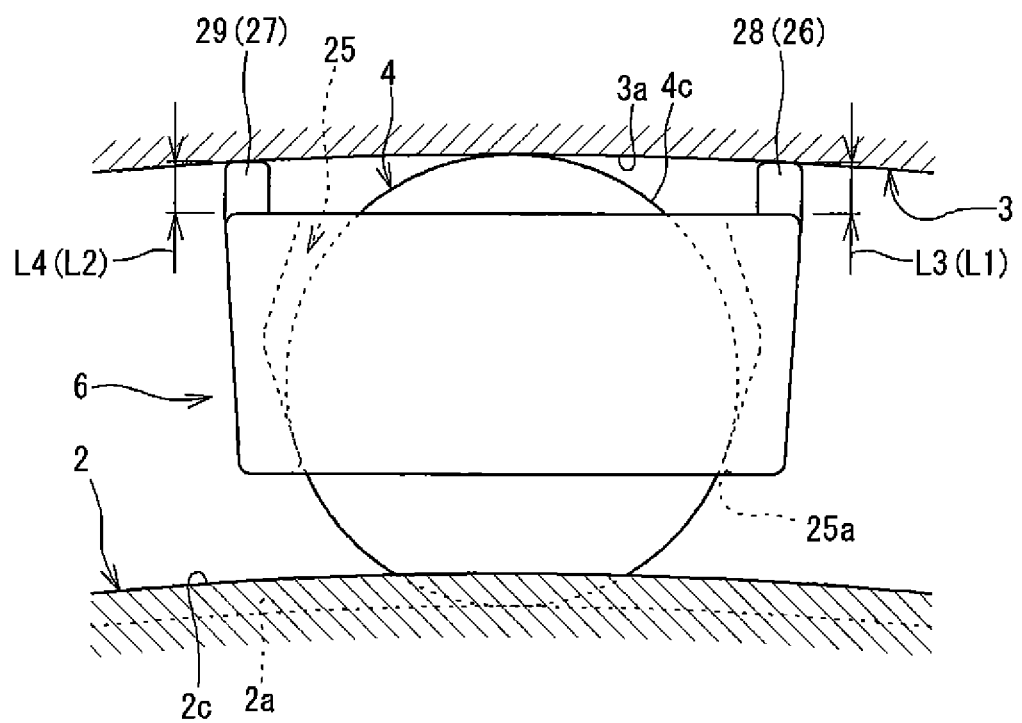
FIG. 17 is a side view illustrating the state where the cage segment according to the third embodiment is displaced radially outward.

FIG. 17 is a side view illustrating the state where the cage segment 6 is displaced radially outward. As illustrated in FIG. 17, each of the projecting lengths L1 to L4 of the first to fourth projections 26 to 29 is set to such a length that the first to fourth projections 26 to 29 are brought into contact with the outer ring raceway surface 3a before the cage segment 6 is detached from the tapered roller 4, when the cage segment 6 is displaced radially outward, that is, the insertion opening 25a of the pocket 25 is displaced in such a direction that the tapered roller 4 comes out of the insertion opening 25a.

Thus, when the cage segment 6 is displaced radially outward due to, for example, vibrations, the first to fourth projections 26 to 29 are brought into contact with the outer ring raceway surface 3a before the cage segment 6 is detached from the tapered roller 4. As a result, it is possible to prevent the cage segment 6 from being detached from the tapered roller 4 to cause breakage of the cage segment 6. Note that, the features that are not described in the third embodiment are the same as those in the first embodiment.

The invention is not limited to the embodiments described above, and may be implemented in various other embodiments. For example, in each of the embodiments described above, two projections are formed on each of the rim portions 21, 22 of the cage segment 6, or each of the cage bar portions 23, 24 of the cage segment 6. However, one projection, or three or more projections may be formed on each of the rim portions 21, 22 of the cage segment 6, or each of the cage bar portions 23, 24 of the cage segment 6. The invention may be applied not only to a tapered roller bearing but also to a cylindrical roller bearing.

With the split cage according to the invention, it is possible to prevent the cage segment from being detached from the roller to cause breakage of the cage segment.

What is claimed is:

1. A split cage comprising a plurality of cage segments, each of the cage segments having a pair of rim portions that face each other at a prescribed distance in an axial direction of the split cage, and a pair of cage bar portions disposed between the rim portions to connect the rim portions to each other, the cage bar portions and the rim portions defining a single pocket that accommodates a single roller, the pocket having an insertion opening through which the roller is inserted into the pocket from one of a radially outside and a radially inside, wherein:

turning of each of the cage segments is guided by the roller, the cage segments being arranged in a circular pattern along a circumferential direction of the split cage, in an annular space between an inner ring and an outer ring;

each of the cage segments has projections formed so as to project toward the other one of the radially outside and the radially inside, the projections being formed at both the rim portions and the cage bar portions, or at the rim portions or the cage bar portions; and a projecting length of each of the projections is set to such a length that the projections are brought into contact with an outer peripheral side portion of the inner ring or an inner peripheral side portion of the outer ring, which is located on the other one of the radially outside and the radially inside, before the cage segment is detached from the roller when the cage segment is displaced to the other one of the radially outside and the radially inside, wherein each of the cage bar portions has a pocket-side face, the pocket-side face being allowed to be in sliding contact with an outer peripheral face of the roller, and each of the pocket-side faces has i) an inner tilted face and ii) an outer tilted face that is formed at a position radially outward of the inner tilted face, the inner tilted face and the outer tilted face forming a substantially v-shaped surface such that a portion where the inner tilted face and the outer tilted face are connected to each other is not allowed to contact the outer peripheral face of the roller, the inner tilted face linearly extending until a radially inner end of the pocket side face and the outer tilted face linearly extending until a radially outer end of the pocket side face.

2. The split cage according to claim 1, wherein:

each inner tilted face is formed so as to be tilted such that part of the inner tilted face except the radially inner end of the pocket-side face is in contact with the outer peripheral face of the roller, and each outer tilted face is formed so as to be tilted such that part of the outer tilted face except the radially outer end of the pocket-side face is in contact with the outer peripheral face of the roller.

3. A roller bearing comprising:
an inner ring;
an outer ring;
a plurality of rollers rollably disposed in an annular space between the inner ring and the outer ring; and
the split cage according to claim 1.

4. A roller bearing comprising:
an inner ring;
an outer ring;
a plurality of rollers rollably disposed in an annular space between the inner ring and the outer ring; and
the split cage according to claim 2.

* * * * *